United States Patent
Tang et al.

(10) Patent No.: US 8,859,698 B2
(45) Date of Patent: Oct. 14, 2014

(54) SULFUR-CONTAINING MACROMOLECULES AND METHODS FOR THEIR PREPARATION

(75) Inventors: Benzhong Tang, Hong Kong (CN); Ka Wai Jim, Hong Kong (CN); Anjun Qin, Zhejiang (CN); Wing Yip Lam, Hong Kong (CN); Jianzhao Liu, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 266 days.

(21) Appl. No.: 13/391,186

(22) PCT Filed: Aug. 6, 2010

(86) PCT No.: PCT/CN2010/001195
§ 371 (c)(1),
(2), (4) Date: Feb. 17, 2012

(87) PCT Pub. No.: WO2011/020287
PCT Pub. Date: Feb. 24, 2011

(65) Prior Publication Data
US 2012/0148958 A1    Jun. 14, 2012

Related U.S. Application Data

(60) Provisional application No. 61/272,148, filed on Aug. 21, 2009.

(51) Int. Cl.
  *C08G 12/30* (2006.01)
  *C08G 75/04* (2006.01)

(52) U.S. Cl.
  CPC .................. *C08G 75/045* (2013.01)
  USPC ........... 526/289; 526/279; 526/241; 526/217; 526/172; 430/296; 430/322

(58) Field of Classification Search
  USPC .......... 526/289, 279, 241, 217, 172; 430/296, 430/322
  See application file for complete search history.

(56) References Cited

U.S. PATENT DOCUMENTS

| | | | | |
|---|---|---|---|---|
| 8,436,118 B2 * | 5/2013 | Tang et al. | ..... | 526/285 |
| 2010/0129757 A1 * | 5/2010 | Tang et al. | ..... | 430/322 |

OTHER PUBLICATIONS

Koroda et al. (Macromolecules 1995, 28,6030-6025).*
Ogawa et al. (J. Am. Chem. Soc. 1999, 121, 5108-5114).*

* cited by examiner

*Primary Examiner* — Shane Fang
(74) *Attorney, Agent, or Firm* — Nath, Goldberg & Meyer; Joshua B. Goldberg; Tanya E. Harkins

(57) ABSTRACT

A sulfur-containing macromolecule and a method of preparing the sulfur-containing macromolecule comprising a polymerization step are provided, where the sulfur-containing macromolecule contains internal units of formula (I) and the polymerization step is formula (II) wherein n is greater than 1, said precursor comprises alkyne having one or more acetylene groups and thiol having one or more thiol groups; and R is remainder of said thiol excluding said thiol groups, R' is remainder of said alkyne excluding said acetylene groups, and R and R' are selected from organic or organometallic groups.

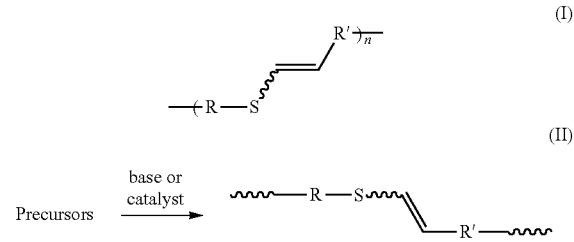

6 Claims, 8 Drawing Sheets

SULFUR-CONTAINING MACROMOLECULES AND METHODS FOR THEIR PREPARATION

CROSS REFERENCE TO RELATED APPLICATION

This application claims priority under 35 U.S.C. §119(e) to U.S. Provisional Patent Application No. 61/272,148 filed 21 Aug. 2009, the entire contents of which are incorporated herein by reference.

FIELD OF THE INVENTION

The subject matter of the present application relates to sulfur-containing macromolecules and a method for preparing the same. In particular, the present subject matter relates to sulfur-containing polymeric materials, linear and branched, and dendrimers bearing vinylene sulfides as structural units. These vinylene sulfide-based macromolecules can be produced by both metal free- and metal catalyzed-hydrothiolation of alkynes.

BACKGROUND OF THE INVENTION

Functional polymers are promising materials for high-technology innovations, and developing new synthetic routes for these polymers is an important research area in macromolecular science. Incorporation of sulfur into the structure of macromolecules is one method to obtain advanced functional materials, since sulfur-containing macromolecules bear advanced properties. However, incorporation of sulfur moieties into a macromolecular structure may also encounter many problems like reactivity, solubility, difficulty in synthesis of monomers, and complicated steps in obtaining the target macromolecules.

Hydrothiolation of an alkyne is a reaction where thiol and acetylene react with each other and form a vinyl product. Vinyl molecules are of interest to many scientists due to their novel properties, such as their insulating properties. In 1956, Truce and Simms discovered a nucleophilic reaction between aromatic or alkyl acetylene with sodium thiolate, which gives vinyl sulfides in high yields (William E. Truce and Joh A. Simms, *J. Am. Chem. Soc.* 1956, 12, 2756-2759). This reaction was later termed "Alkyne Hydrothiolation". In 1987, Oshima, Ichinose and coworkers successfully utilized triethylboron as a radical to initiate the reaction of acetylenes and thiols (Ichinose et al., "Et$_3$B Induced Radical Addition of Thiols to Acetylenes," *Chem. Lett.,* 1987, pp. 1647-1650). Transition-metal complexes were employed for such reactions, but the early attempts were met with little success because of the poisonous interactions of sulfur atoms with metal catalysts.

Newton succeeded in adding thiophenol to a highly reactive alkyne molecule using molybdenum as a catalyst (McDonald et al., "Catalysis by Molybdenum Complexes. The Reaction of Diazenes and Acetylenes with Thiophenol," *Inorg. Chem.,* 1976, Vol. 15, No. 9, pp. 2056-2061). However, using this reaction the product was obtained in a relatively low yield. In 1992, Ogawa and Sonoda (Akiya Ogawa and Noboru Sonoda et al., *J. Am. Chem. Soc.* 1992, 114, 5902-5903) revealed that rhodium and palladium complexes can effectively catalyze such a reaction, producing both branched and linear vinyl sulfides as products. Since then, alkyne hydrothiolation has become one of the most widely studied reactions and many radicals, nucleophiles, and metal complexes have been found to work as catalysts by different mechanisms (Jan-E, Backvall and Anna Ericsson, *J. Org. Chem.* 1994, 59, 5850-5851; Li-Biao Han et al., *J. Am. Chem. Soc.* 2004, 26, 5080-5081; Akiya Ogawa et al., *J. Am. Chem. Soc.* 1999, 121, 5108-5114; Suzanne Burling et al., *Dalton Trans.* 2003, 4181-4191).

Macromolecules with a high refractive index are potential candidates for applications in photo-optical devices. Target macromolecules need to have good film forming ability, high transparency, a high refractive index and high thermal stability. One method to obtain high refractive index macromolecules is to incorporate sulfur or other hetero atoms, like nitrogen, oxygen, etc., into the structure of macromolecules.

Different research groups have synthesized sulfur-containing macromolecules by various means, by simply mixing different ingredients (WO 2007/088556 or by incorporating sulfur into a monomer structure (Rie Okutsu et al., *Macromolecules,* 2008, 41, 6165-6168; Nam-ho You et al., *Polymer,* 2009, 50, 789-795). Another method to obtain high refractive index macromolecules is to incorporate metal moieties into the structure. With the addition of metal, the refractive index of the macromolecules can be greatly enhanced (US 2009/0111677). However, this usually results in the low processability and the low transparency of the macromolecule to be targeted.

Hydrothiolation of acetylene with thiol may produce branched and linear vinyl sulfides in high yields. Scientists have actively explored catalysts for this reaction to synthesize vinyl sulfides with different substituents; however, little effort has been developed toward its utilization in the synthesis of new macromolecules. In addition, alkyne hydrothiolation of acetylenes and thiols with triple and mercapto bonds, equal to or greater than two, may generate polymers with linear and hyperbranched structures. By using a stepwise reaction, dendrimers containing such functionality can also be obtained. Such possibilities, however, have not yet been explored, despite the fact that such macromolecules may exhibit novel material properties. Accordingly, there have been needs for a new method for preparing sulfur-containing macromolecules having new properties by employing alkyne hydrothiolation.

SUMMARY OF THE PRESENT SUBJECT MATTER

The present application provides a new method for preparing sulfur-containing macromolecules, which are processable and a have high refractive index and high transparency. Linear, branched or hyperbranched monomers and polymers, or even dendrimers, can be obtained by employing this method. Using this method, the synthesis of monomers is simple and easy; the polymerization reaction can be catalyzed by either basic conditions or a transition-metal catalyst, is highly functionality-tolerant, and provides a final product that can be obtained in high yields. The polymerization is carried out as a one-pot single-step reaction procedure, giving sulfur-containing oligomers and macromolecules in high yields and high molecular weights. The ability of the polymers to dissolve in common organic solvents enables determination of the structure of the polymers by standard spectroscopic methods, and readily facilitates their processability and applicability. The polymers are processable, easily film-forming and thermally stable.

Accordingly, in an embodiment of the present subject matter sulfur-containing polymers are provided which comprise a plurality of internal units represented by the following formula (1a),

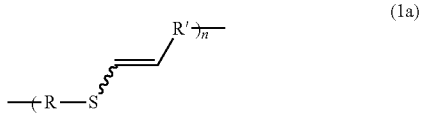

wherein n is greater than 1; and R and R', being identical or different, are independently selected from organic or organometallic groups. The polymers are processible, easily film-forming, thermally stable and bear high refractive indices.

In another embodiment of the present subject matter a method of preparing sulfur-containing polymers having the internal units of the formula (1a), as above, are provided which comprises the following polymerization step:

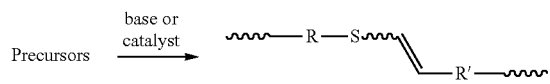

wherein said precursor comprises alkyne (i.e., alkylenes) having one or more acetylene groups (i.e., alkynyl) and thiol having one or more thiol groups (i.e., mercapto); and R is remainder of said thiol excluding said thiol groups, R' is remainder of said alkyne excluding said acetylene groups, and R and R' are selected from organic or organometallic groups. As used herein, the word "more" means two or more than two. The polymerization reaction is a simple one-pot reaction, is high functionality-tolerant and gives oligomer and polymers with high yields. The preparation of both the monomers and polymers is easy, which will make the application of this material more convenient. The high sulfur presence in the polymer structure helps the polymers to achieve high refractive indices.

In another embodiment of the present subject matter, a method for forming a pattern on a substrate on which a composition comprising the sulfur-containing polymer is applied, which method comprises applying an energy source to the polymer composition, is provided. As an energy source, UV-irradiation, e-beam or laser can be used.

DETAILED DESCRIPTION OF THE PRESENT SUBJECT MATTER

Figure 1:
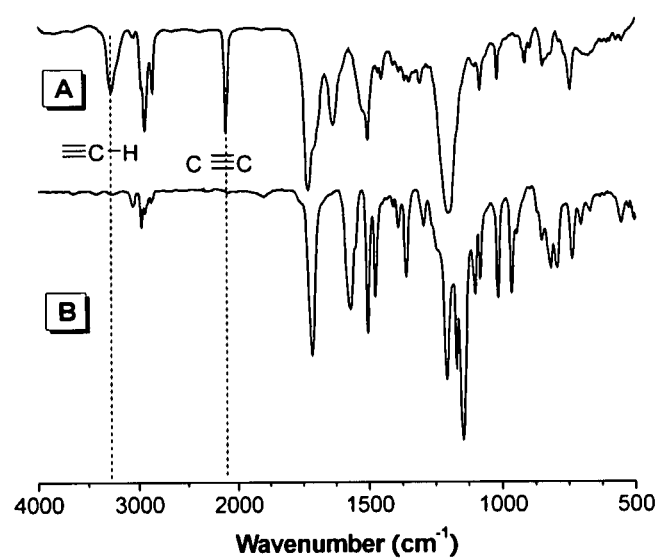
FIG. 1 displays IR spectra of monomer 3 (A) and polymer P1/3 (B).

The sulfur-containing polymers according to the present subject matter comprise a plurality of internal units represented by the following formula (1a),

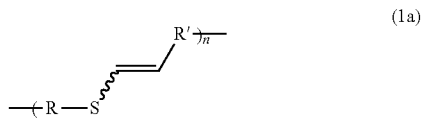

wherein n is greater than 1 and R and R', being identical or different, are independently selected from organic or organometallic groups.

In one embodiment of the formula (1a), n is greater than 1. In another embodiment, n is at least 10. In a further embodiment, n is between 10 and 1000.

R and/or R' in formula (1a) can be any organic groups or organometallic groups, including but not limited to optionally substituted alkyl, alkenyl or aromatic groups with or without metals in the structure thereof. The phrase "organic groups" as used herein refers to radicals from organic compounds that are known in the art as any member of a large class of chemical compounds whose molecules contain carbon. The phrase "organometallic groups" as used herein refers to radicals from organometallic compounds that are known in the art as chemical compounds containing bonds between carbon and a metal.

Optionally substituted alkyl groups, unless otherwise specified, may be linear or branched and may contain up to 24 carbon atoms. In other embodiment, the substituted alkyl groups may contain up to 20 carbon atoms. In a further embodiment, the substituted alkyl groups may contain up to 18 carbon atoms.

Optionally substituted alkenyl groups, unless otherwise specified, may be linear or branched and may contain up to 12 carbon atoms. In other embodiment, the substituted alkenyl group may contain up to 6 carbon atoms. In a further embodiment, the substituted alkenyl group may contain up to 4 carbon atoms.

Optionally substituted aromatic group may be any aryl or heteroaryl group, with aryl groups being particularly preferred. The aryl group may be any monocyclic or polycyclic aromatic hydrocarbon group and may contain from 6 to 14 carbon atoms. In another embodiment, the aryl group may be any monocyclic or polycyclic aromatic hydrocarbon group and may contain from 6 to 10 carbon atoms. Preferred aryl groups include but are not limited to phenyl, naphthyl, anthryl and phenanthryl groups, especially a phenyl or naphthyl, and particularly a phenyl, group. The heteroaryl group may be any aromatic monocyclic or polycyclic ring system which contains at least one heteroatom. Preferably, the heteroaryl group is a 5- to 14-membered, and especially a 5- to 10-membered, aromatic ring system containing at least one heteroatom selected from oxygen, sulfur and nitrogen atoms. Preferred heteroaryl groups include but are not limited to pyridyl, pyrrolyl, furyl, thienyl, indolinyl, imidazolyl, pyrimidinyl, pyrazinyl, oxazolyl, thiazolyl, purinyl, quinolinyl, quinoxalinyl, pyridazinyl, benzofuranyl, benzoxazolyl and acridinyl groups.

Metals in the organometallic group may be one or more of those customarily employed metals in the development of polymers, films or ceramic materials, or in the modification of such compounds to influence their properties and/or activities. Non-limited examples of such metals include Si, Fe, Ir, Zn, Al and Si. In one embodiment of the present subject matter, Fe is preferred.

The optional substituents for the organic or organometallic group may be any one or more of those customarily employed in the development of polymers, films or ceramic materials, or in the modification of such compounds to influence their structure/activity, stability or other properties. Specific examples of such substituents include, but are not limited to, halogen atoms, nitro, cyano, hydroxyl, alkyl, alkenyl, acyl, heteroaryl, cycloalkyl, heterocycloalkyl and heteroalkyl, haloalkyl, alkoxy, haloalkoxy, amino, alkylamino, dialkylamino, formyl, alkoxycarbonyl, carboxyl, alkanoyl, alkylthio, alkylsulphinyl, sulphonyl, alkylsulphonyl, carbamoyl and alkylamido groups.

When any of the foregoing substituents represents or contains an alkyl substituent group, this alkyl substituent group may be linear or branched and may contain up to 12 carbon atoms. In another embodiment, the alkyl substituent group may be linear or branched and may contain up to 6 carbon atoms. In a further embodiment, the alkyl substituent group may contain up to 4 carbon atoms.

A halogen atom useful herein may be a fluorine, chlorine, bromine or iodine atom. Any group which contains a halo moiety, such as a haloalkyl group, contains one or more of these halogen atoms.

In one embodiment, each R of the formula (1a) may be identical to every other R in all of the internal units in a single macromolecule. In the alternative, each R may be different from every other R in all of the internal units in a single macromolecule. Likewise, each R' may be identical or different in a single macromolecule. Preferably, R and R' are each independently selected from the group consisting of:

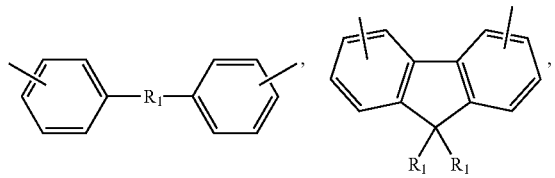

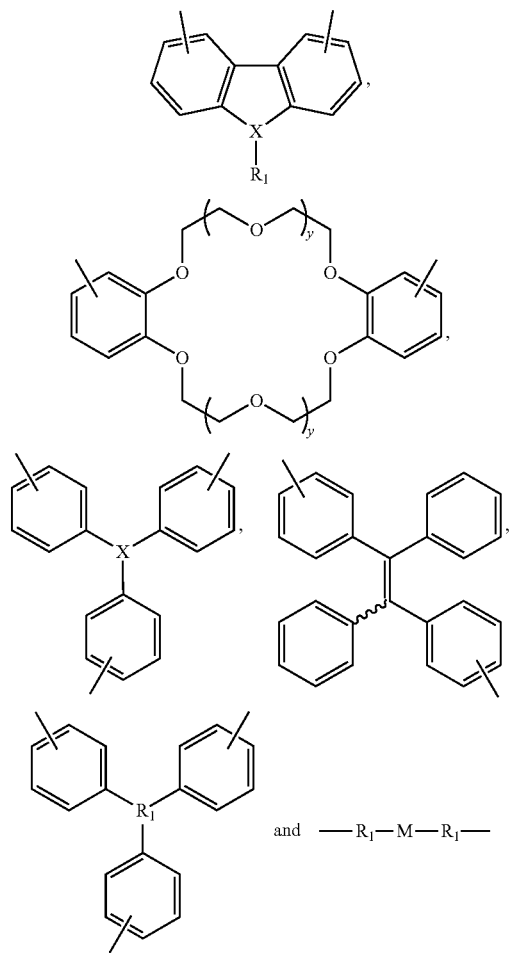

wherein X is a heteroatom, such as nitrogen (N), phosphorus (P), or sulphur (S); y is ≥1; $R_1$ is selected from the group consisting of alkyl, alkenyl, acyl, aryl, heteroaryl, cycloalkyl, heterocycloalkyl and heteroalkyl; and M is a metal or an organometallic group, for example, M can be ferrocene (Fc), or silicon (Si). X and M are the same regardless of whether they are used with respect to R or R'.

Accordingly, the sulfur-containing polymer containing the internal units of formula (1a) is preferably selected from the group consisting of:

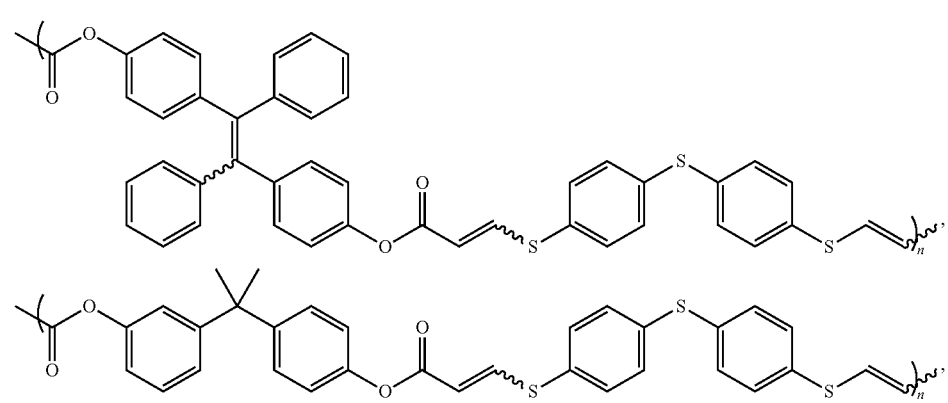

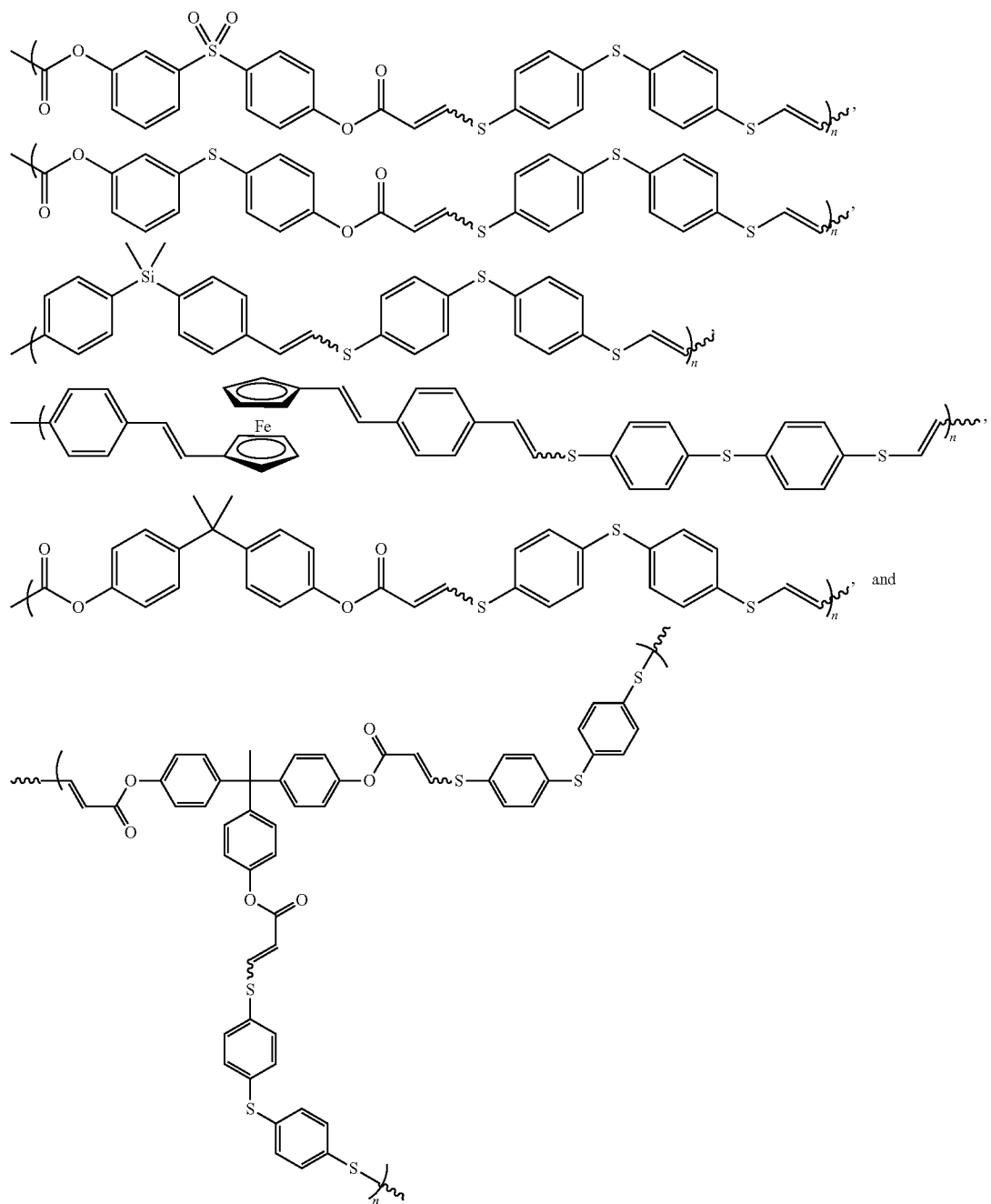

wherein n>1.

The sulfur-containing polymers according to the present subject matter are soluble and thus processible, easily film-forming, thermally stable and have a high refractive index. From the characterization data by IR, $^1$H NMR and $^{13}$C NMR, satisfactory results for these polymers are obtained. Also, the polymers can be blended with a variety of macromolecules for general use.

One method of preparing the sulfur-containing macromolecules according to an embodiment of the present subject matter employs thiols and alkynes of general structure 8 and 9, respectively, as shown in Scheme 1, where R and R', being identical or different, independently are selected from any type of organic or organometallic groups, as described above regarding the sulfur-containing polymers.

Scheme 1

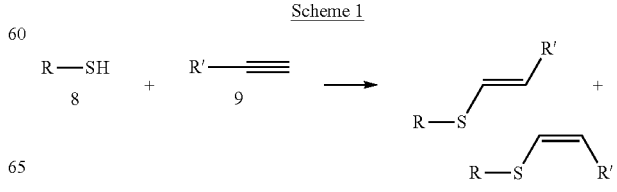

The method can be used for the preparation of soluble and processable branched oligomers and macromolecules containing vinylene sulfide moieties as shown in Scheme 2, where R and R' are the same as defined above in Scheme 1 and P and P' are protection groups of acetylenes and thiols. It should be noted that R and R' in the monomer structures can be extended to every imaginable compound including organic or organometallic functionalities. Also, any protecting groups that can be used for acetylenes and thiols can be used in the method, as P and P'. Non-limiting examples in this regard include tert-butyl moieties, aromatic thioesters, thioether derivatives, thiocarbonate derivatives, disulfides, and the like.

Scheme 2

(A) Linear Polymerization

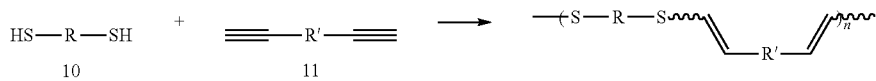

(B) Hyperbranched Polymerization

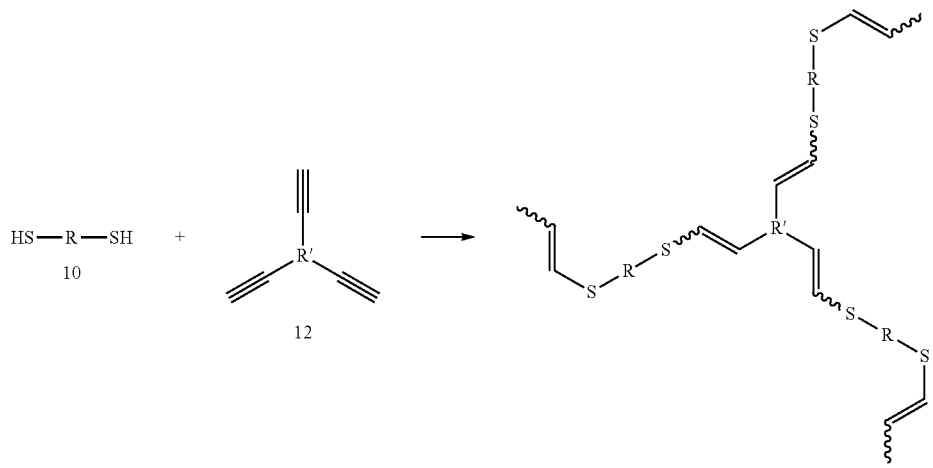

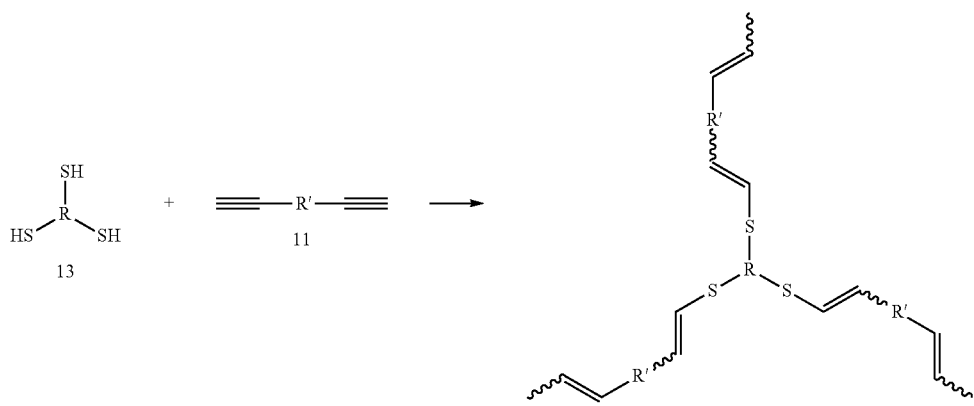

(C) Dendrimer Polymerization
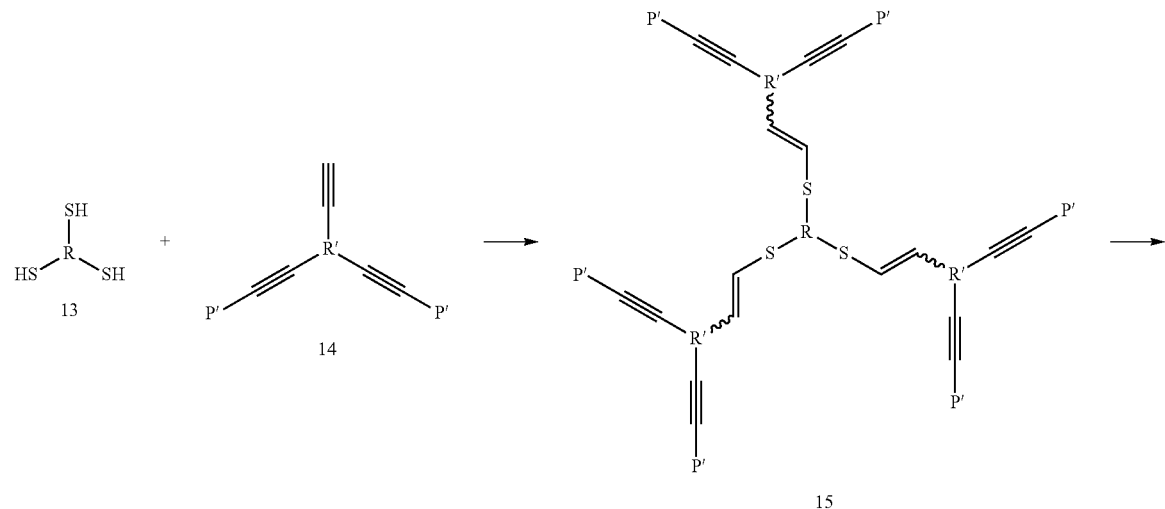
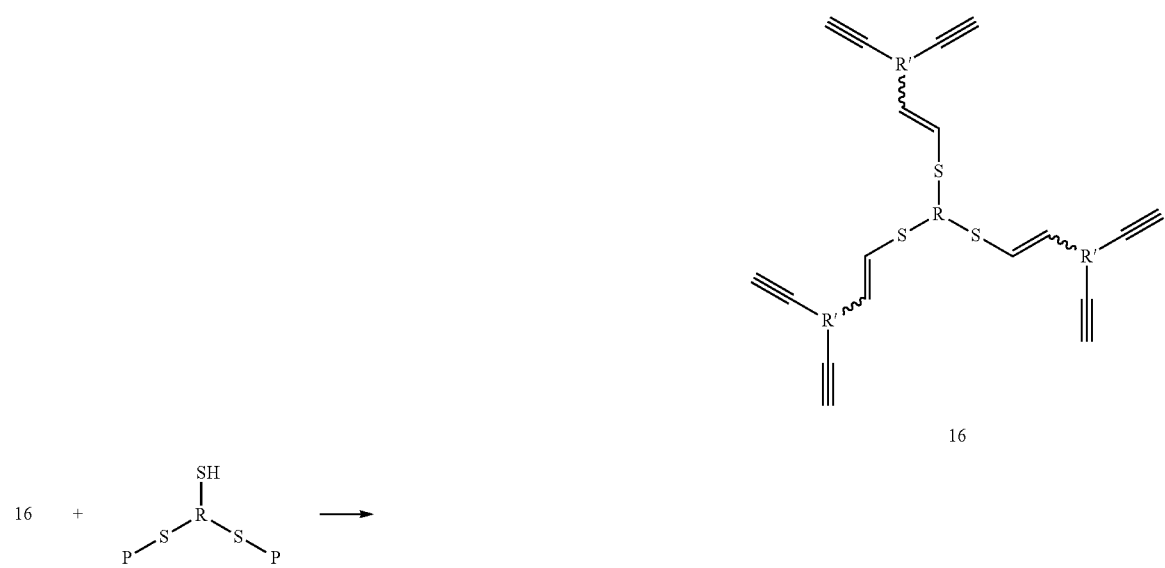

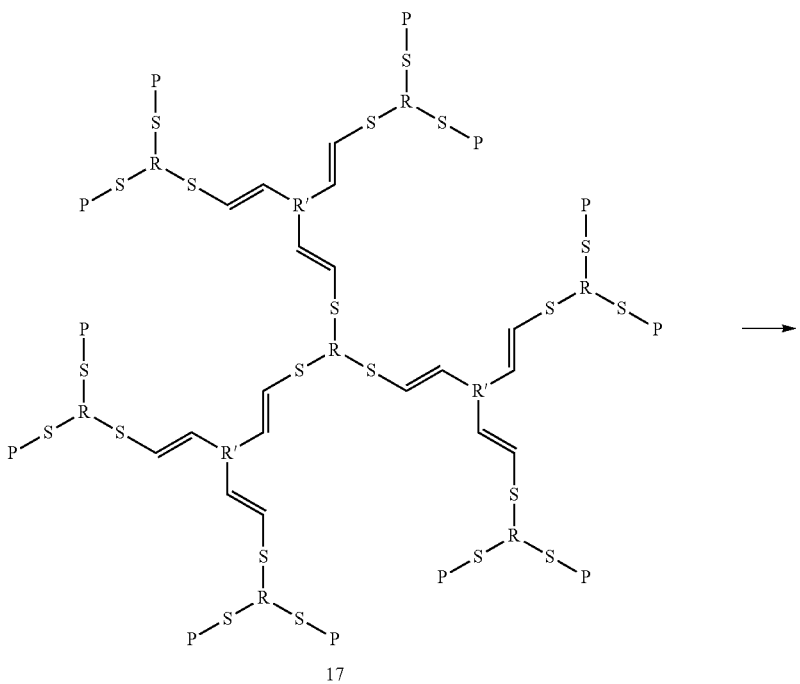

17

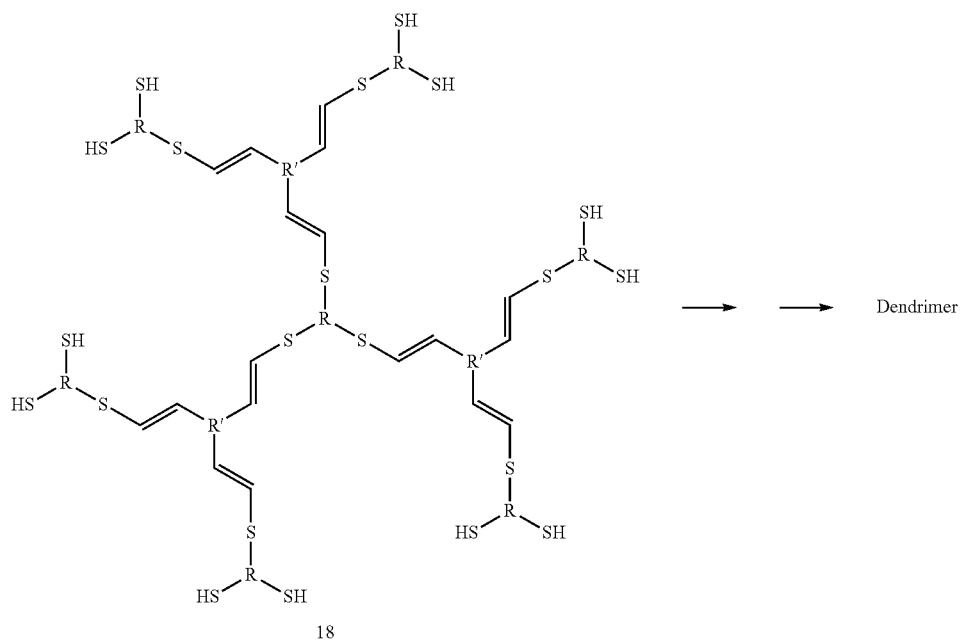

18

→ → Dendrimer

The presence of sulfur or metal in the polymer material helps to increase the refractive index of the polymer material. Accordingly, as the sulfur content in the polymer increases, so does the refractive index of the polymer. The use of precursors having a higher sulfur content will thus result in polymers having a higher refractive index.

One method according to an embodiment of the present subject matter is a simple reaction to obtain sulfur-containing macromolecules employing thiols and alkynes, different from other conventional methods where sulfur- or metal-containing compounds are mixed with polymers, such as PMMA. Those conventional methods are, however, complicated.

The monomers can be commercially available from suppliers or can be synthesized by simple organic reactions. One synthetic method by a hydrothiolation reaction according to the present subject matter is shown in Scheme 3, where thiophenol 19 and carboxylated acetylene 20 react with each other and produce product 21 in high yield.

Scheme 3

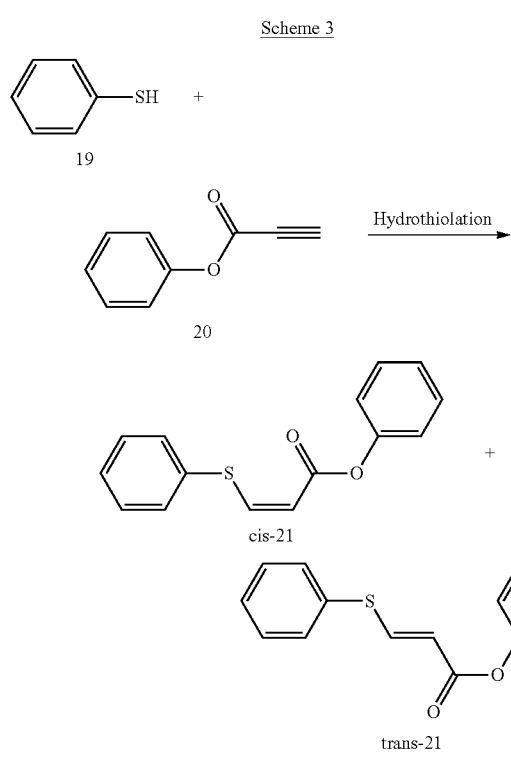

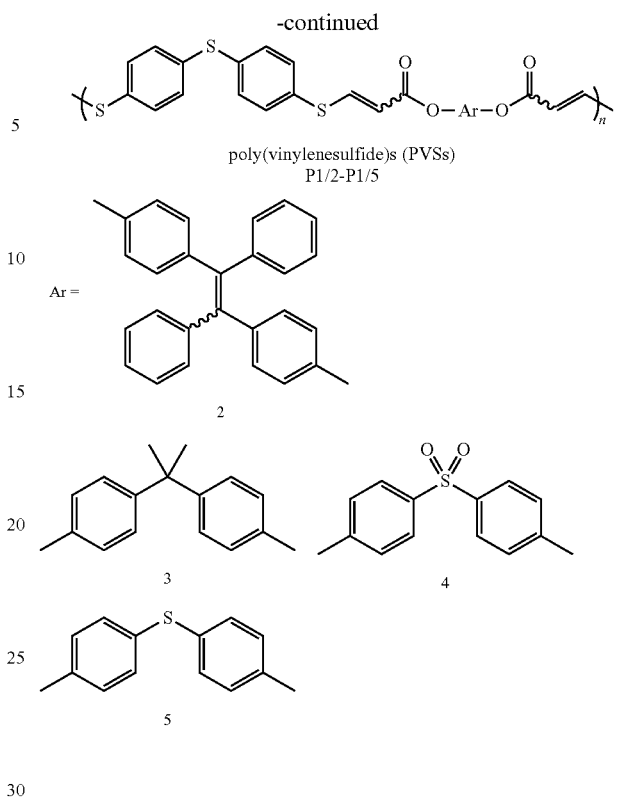

Figure 2:
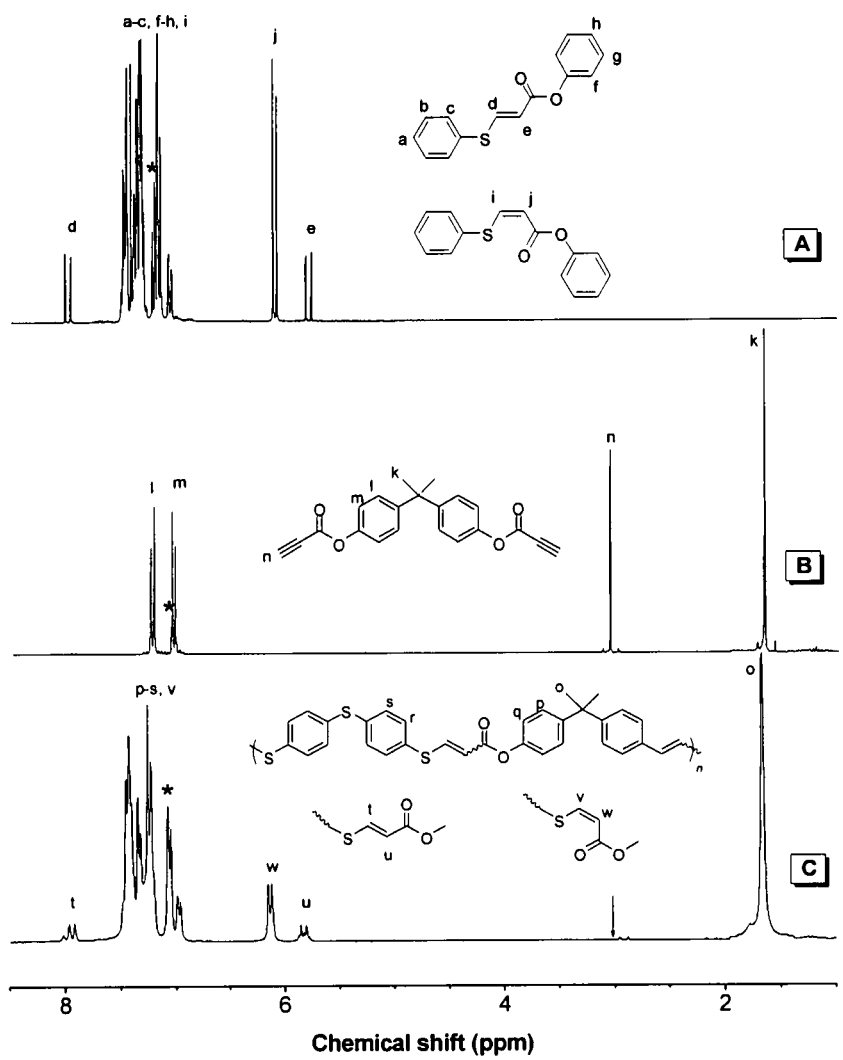
FIG. 2 displays $^1$H NMR spectra of compound 21 (A), monomer 3 (B) and polymer P1/3 (C), in CDCl$_3$. The solvent peaks are marked with asterisks.

Compound 21 is analyzed by a standard spectroscopic analysis, and satisfactory data are obtained from the analysis. Compound 21 shows strong vinyl proton resonance peak at δ=5.82, 6.087 and 7.062 ppm, while the acetylene resonance peak of alkyne compound 20 disappears. All other peaks resulting from the attached phenyl moieties remain the same with no other peaks found, which suggests successful conversion of thiol compound 19 and alkyne compound 20 to vinylene sulfide compound 21. Similar results are also obtained from $^{13}$C NMR analysis. In $^{13}$C NMR analysis, all peaks can be readily assigned to the expected structure of compound 21 (FIG. 2).

With the successful preparation of compound 21, the method can likewise be utilized for the preparation of linear polymers (Schemes 4 and 5). For this, different diyne monomers are prepared and reacted under different reaction conditions. The resulting polymers are afterwards collected by precipitation into diethyl ether.

Scheme 4

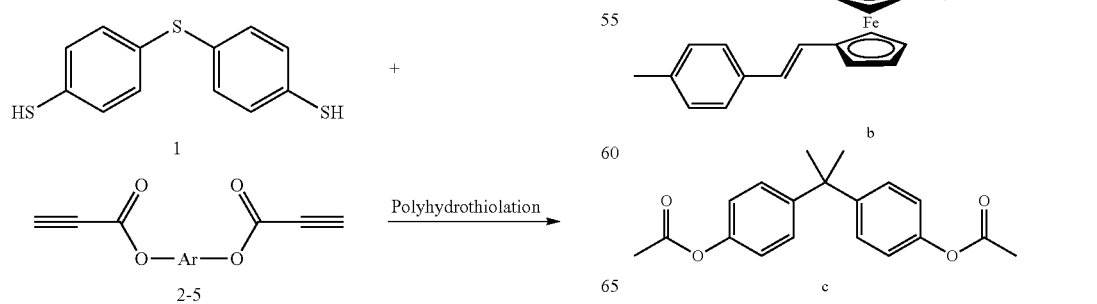

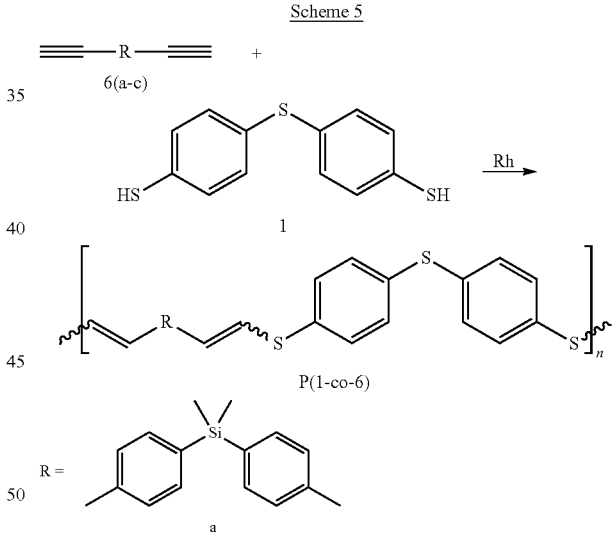

Scheme 6

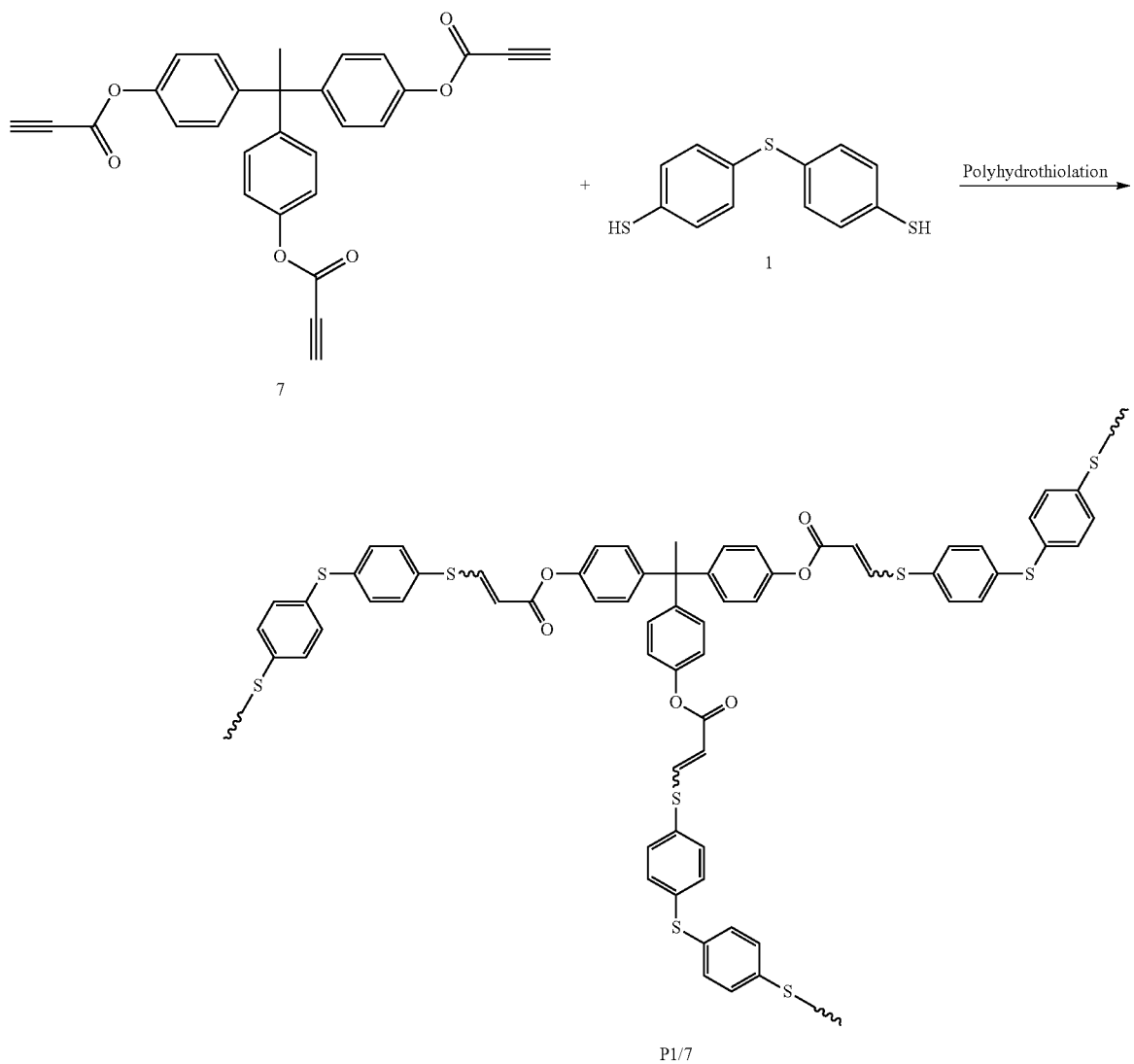

In the above methods, processable materials can be obtained by the reaction between alkynes and thiols in different ratios under optimized reaction conditions. Such reaction conditions include solvents, polymerization time, temperature, concentration of monomers, catalysts, etc. The effect of each reaction condition of solvents, base, base concentration, polymerization time, temperature, monomer concentration and catalysts are shown in Table 1 to Table 12 in the Examples.

Any conventional solvents that have been used in preparing polymers may be used for the polyhydrothiolation reaction according to the present subject matter. Non-limiting examples thereof include THF, 1,2-diclorobenzene, toluene, dioxin and DME, DCM, chloroform, DMF, DMAP, DMAc, and 1,4-dioxane, taken alone or in combination. Using these solvents, the polymers are obtained in high yields having a molecular weight up to 5,200.

Any conventional bases that have been used in preparing polymers may be used for the polyhydrothiolation reaction according to the present subject matter, which includes but is not limited to diethylamine, triethylamine, diphenylamine, triphenylamine, piperidine, methylpiperazine, morpholine, and mixtures thereof. With the addition of a base(s), the molecular weight of the obtained polymer increases. A base can be added to the reaction mixture in an amount of up to 2.0M, being preferably added in the amount of between 0.6 and 1.2M. As the concentration of the base increases, the molecular weight of the obtained polymer increases.

The polymerization reaction may be conducted at a temperature between room temperature to below the boiling point of the solvent used in the reaction. Room temperature is preferred. In addition, the reaction can be conducted for about 5-36 hours, and preferably for about 20-24 hours. In an embodiment, the reaction is a 24 hour reaction.

The amount of the monomers used in the polymerization reaction can be adjusted depending on various reaction factors. In an embodiment, 0.01 to 0.1M of monomers can be used in the reaction. In another embodiment, 0.04 to 0.08M of monomers can be used in the reaction. In a further embodiment, 0.06M of monomers can be used in the reaction.

The polymers prepared by the present method are characterized by IR, $^1$H NMR and $^{13}$C NMR spectra. IR spectra of monomer 3 and polymer P1/3 are displayed in FIG. 1. No peaks at 3278 and 2128 cm$^{-1}$ associated with the ≡C—H and C≡C stretching, respectively, are found in the spectra of the polymer P1/3. The spectroscopic results are in full accordance with the expected structure of the polymer.

$^1$H NMR of monomer 3, model compound 21 and P1/3 are shown in FIG. 2. New peaks at δ~5.82, 6.087, and 7.962 ppm, which correspond to the protons on the cis- and trans-vinylene groups, are found. The acetylene proton at δ~3.067 ppm disappears after polymerization, suggesting the reaction between thiol and acetylene to give a vinyl group. All the other peaks that can be associated with the aromatic protons remain the same after reaction.

Figure 3:
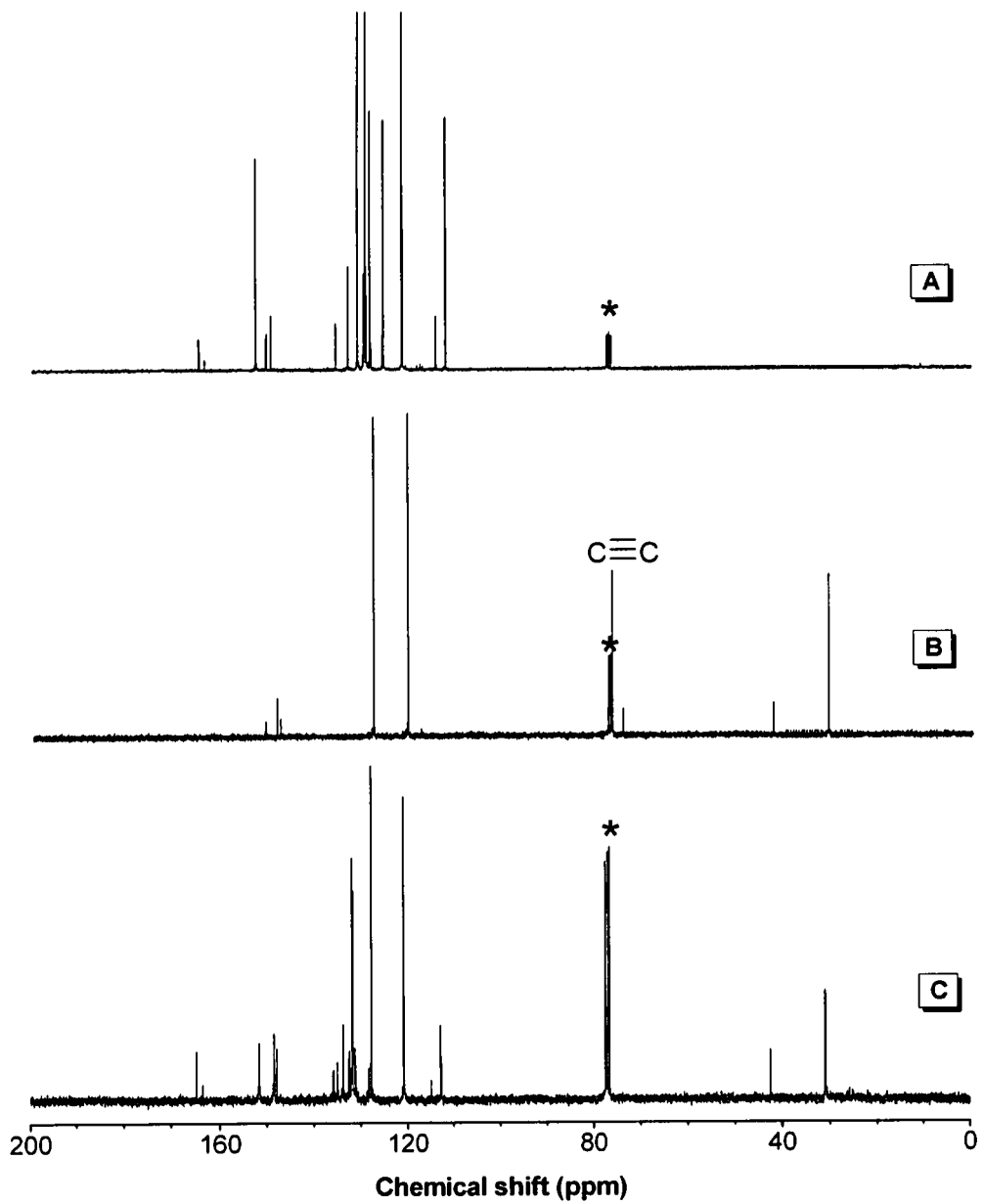
FIG. 3 displays $^{13}$C NMR spectra of compound 21 (A), monomer 3 (B), and polymer P1/3 (C), in CDCl$_3$. The solvent peaks are marked with asterisks.

$^{13}$C NMR spectra of model compound 21, monomer 3 and polymer P1/3 also exhibit expected results, as displayed in FIG. 3. The acetylene peaks disappear after polymerization and all the other peaks easily correlate to the expected structure, as shown in FIG. 3.

Figure 4:
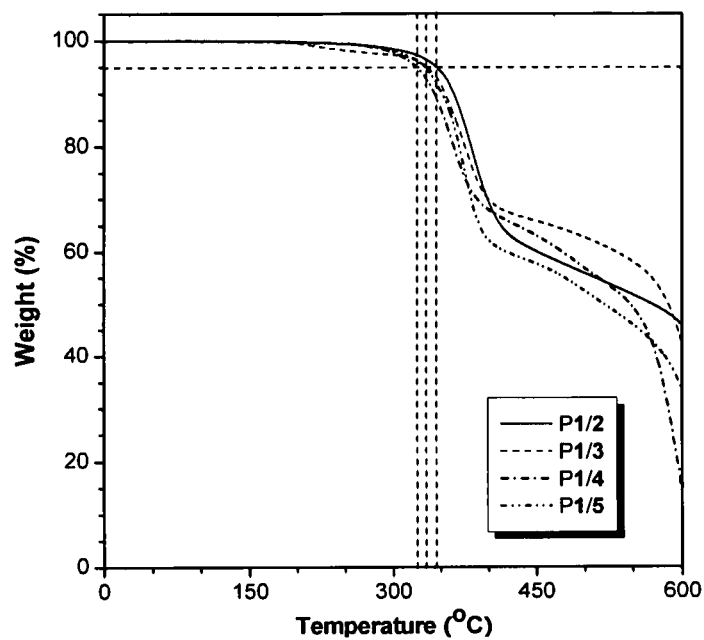
FIG. 4 displays TGA thermograms of polymers P1/2-P1/5 recorded under nitrogen at a heating rate of 10° C./min.

Stability of the polymers has been evaluated by thermogravimetric analysis, as displayed in FIG. 4. All the polymers are very stable and start to degrade only at temperatures above 300° C.

Figure 5:
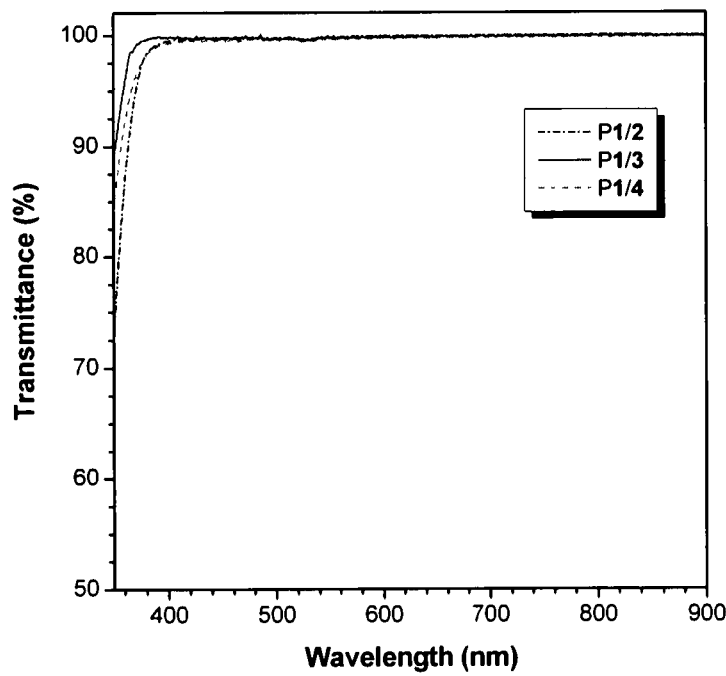
FIG. 5 displays light transmission spectra of THF solutions of P1/2-P1/4. Polymer concentrations (μg/mL) are 7.2 (P1/2), 5.7 (P1/3), and 6.0 (P1/4).

UV spectra of the polymers are shown in FIG. 5. All polymers exhibit high optical transparency after 400 nm. Also, no fluorescence is observed.

Figure 6:
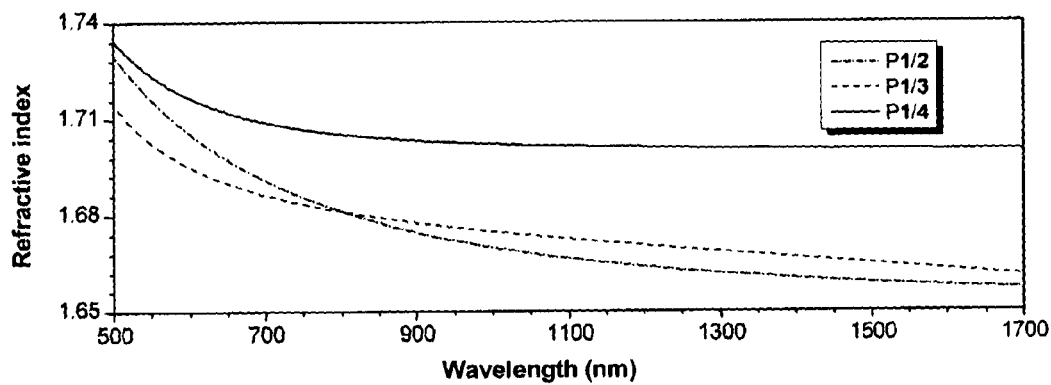
FIG. 6 displays wavelength dependence of refractive index of thin films of P1/2, P1/3 (sample taken from Table 5, no. 1), and P1/4.

Refractive indices (RI) of the polymers are studied. FIG. 6 shows the refractive indices of the polymer films from 500 to 1700 nm. As the sulfur content increases in the polymer, the refractive indices of the polymers gradually increase while the highest RI reaches 1.7 at long wavelength, which is a very high RI for pure organic polymers.

Figure 7:
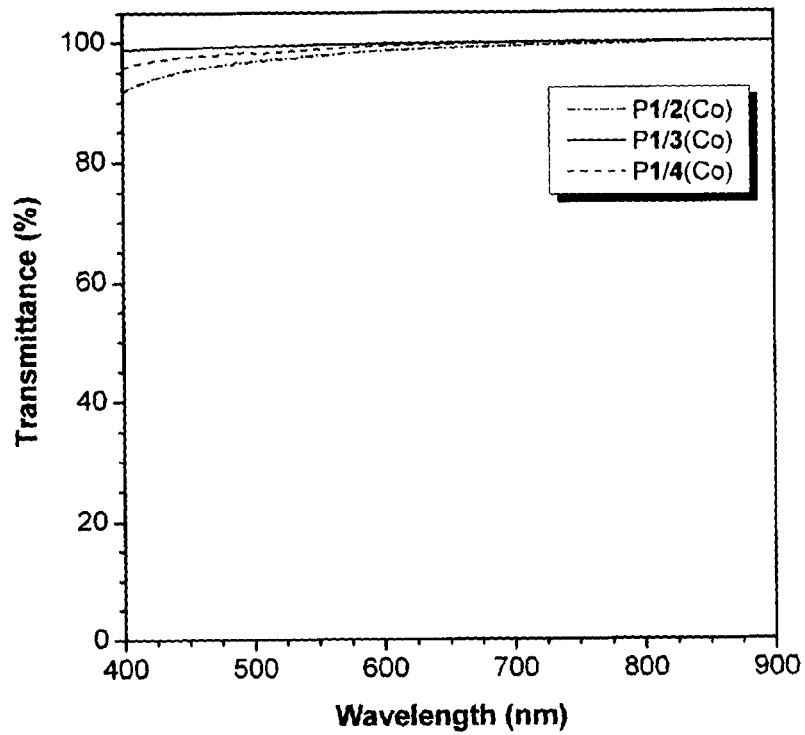
FIG. 7 displays light transmission spectra of thin films of P1/2(Co)—P1/4(Co).
Figure 8:
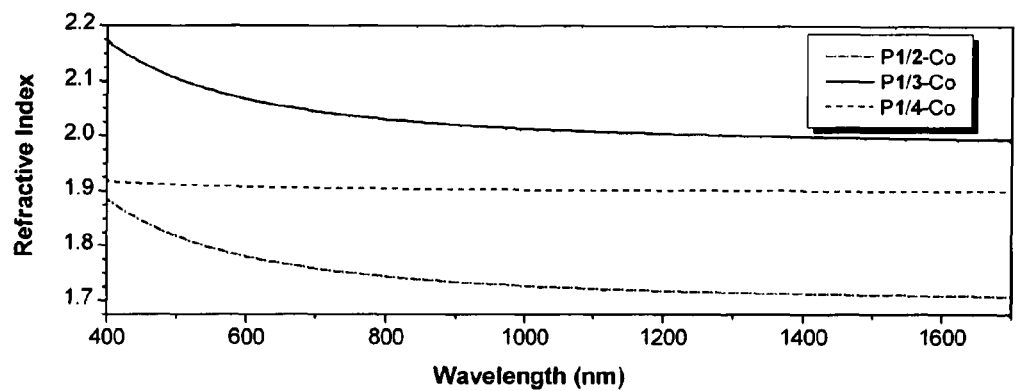
FIG. 8 displays wavelength dependence of refractive index of thin films of P1/2(Co)—P1/4(Co).
Figure 9:
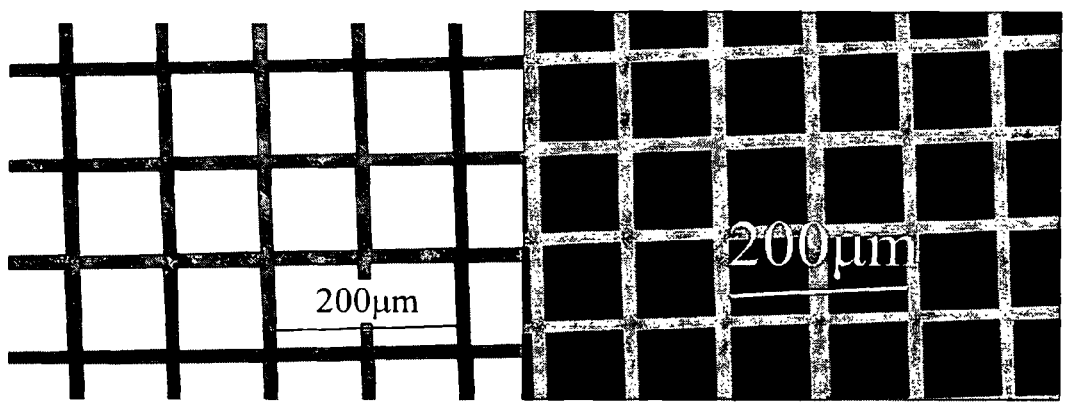
FIG. 9 displays negative photoresist pattern generated by photolithography of P1/2 taken under daylight (left) and fluorescent light (right).

Polymers P1/2 to P1/4 are complexed with $Co_2(CO)_8$. The UV spectra and the refractive indices of the polymer films are re-measured after complexation and displayed in FIGS. 7 and 8. Although the transparency of the polymer films slightly decreases, the refractive indices of the polymers greatly increase after complexation. The refractive indices of the polymer films after complexation can reach as high as 2.0. The optical dispersions of the polymers are not much changed after complexation.

TABLE 1

Ratios of cis- and trans- of PVSs[a]

| Polymer | cis-:trans- |
|---------|-------------|
| P1/2    | 3.57:1      |
| P1/3    | 4.38:1      |
| P1/4    | 2.22:1      |

Figure 10:
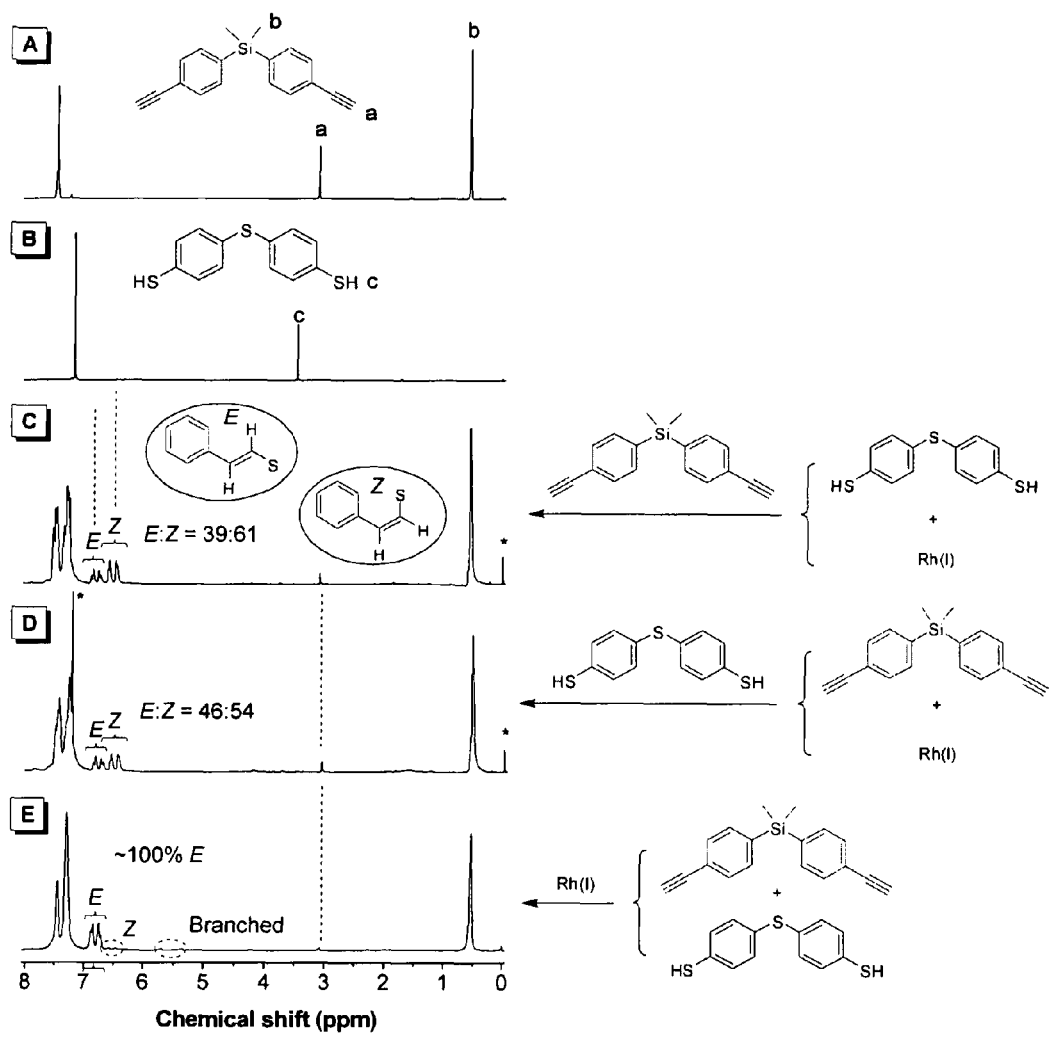
FIG. 10 displays $^1$H NMR spectra of monomers (A and B) and polymers (C-E).

By changing the adding sequence, the ratio between cis- and trans- can be alternated, and the ratio of the trans-moieties can be changed from 39% up to ~100%. $^1$H proton NMR spectra of the monomers and the polymers obtained by different feeding sequence are shown in FIG. 10.

Figure 11:
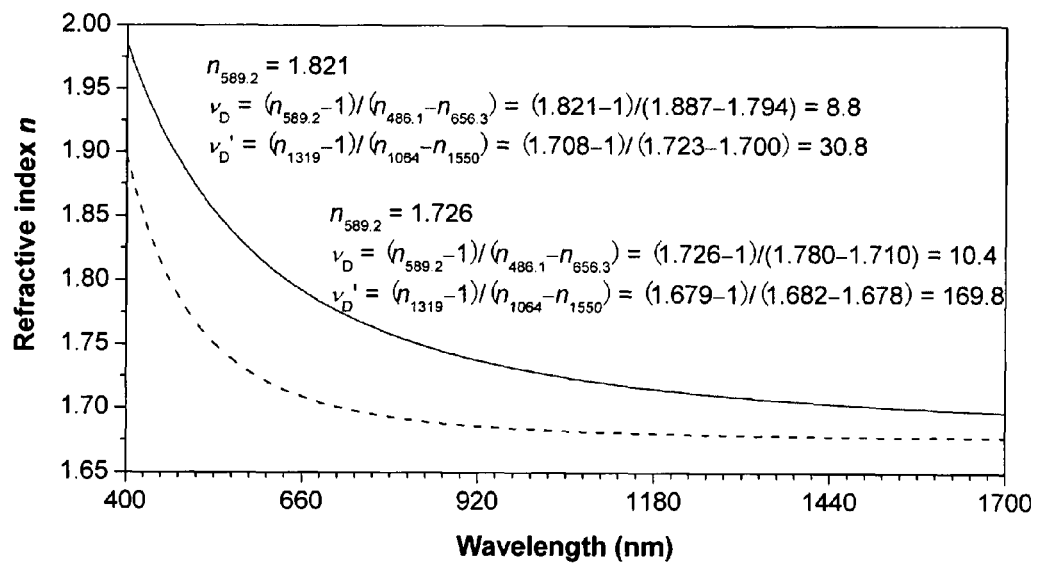
FIG. 11 displays light refraction spectra of thin solid films of P(1-co-6a) (dashed line) and P(1-co-6b) (solid line).

The refractive indices of the polymers from 400 to 1700 nm were also studied and the results are shown in FIG. 11.

Another embodiment of the present subject matter provides a method for forming a pattern on a substrate on which a composition comprising the sulfur-containing polymer is applied, which method comprises applying an energy source to the polymer composition. Non-limiting examples of such an energy source include UV-irradiation, e-beam and laser. By using spin-coating or solution-casting methods, the polymer can form films. By covering a mask on the polymer film and irradiating it with the energy source, the polymer can undergo crosslinking and, after development, a pattern can be formed.

EXAMPLES

The present subject matter is described herein in connection with the following examples. It should be noted, however, that the scope of the present subject matter is not limited to the examples herein.

Example 1

Preparation of Polymer P1/2

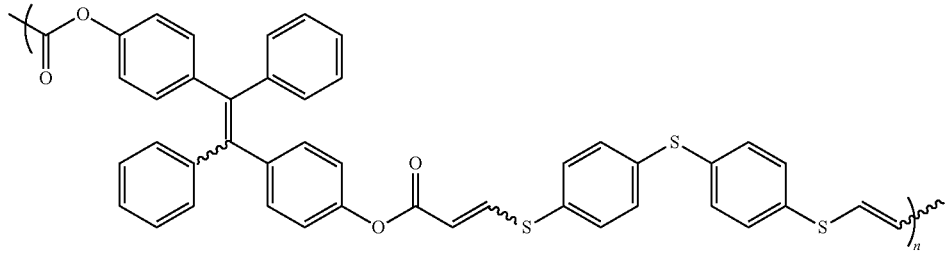

The hydrothiolation reaction can also be catalyzed by a transition metal. Non-limiting examples of such a transition metal include Rh containing complexes, Ir containing complexes, Cu containing complexes, Ni containing complexes, Mo containing complexes and Pd complexes. In one embodiment, the Rh containing complex can be $Rh(PPh_3)_3Cl$. The polymerization data between compounds 1 and 6, catalyzed by a transition metal catalyst were shown in Table 12.

Due to the large difference in the chemical shift between cis- and trans-vinyl protons, the ratio between the cis- and trans-vinyl moieties in the polymer can be calculated by using the integration of the corresponding peaks. The ratio between the two units is calculated and shown in Table 1.

In a 15 mL Schlenk tube equipped with a three-way stopcock on the sidearm was placed 40 mg (0.15 mmol) of 4,4'-thiodibenzenethiol (1), 70 mg of 2 (0.15 mmol), and 0.5 g of diphenylamine (3 mmol) under nitrogen in a glovebox. Distilled DMF (2.5 mL) was injected into the tube using a hypodermic syringe. The mixture was stirred under room temperature for 24 h. Afterwards, the polymerization mixture was added dropwise to ~300 mL diethyl ether containing a small amount of acetic acid through a cotton filter. The precipitate of the polymer was allowed to stand overnight and was then collected by filtration. The isolated polymer was washed with diethyl ether and dried under vacuum at room temperature to a constant weight.

Characterization data: White powder, yield: 73.5%. $M_w$: 21000, $M_w/M_n$: 2.9 (GPC, polystyrene calibration). $^1$H NMR (300 MHz): 5.808, 6.091, 7.033, 7.088, 7.257, 7.336, 7.407, 7.887. $^{13}$C NMR (75 MHz): 112.79, 114.84, 120.66, 127.68, 127.82, 128.30, 131.32, 132.23, 133.66, 134.05, 135.02, 135.91, 140.28, 141.00, 143.52, 148.99, 151.58, 163.17, 164.49, 168.10. IR (KBr), v (cm$^{-1}$): 3050, 2936, 2860, 1714, 1672, 1524, 1502, 1478, 1386, 1358, 1204, 1142, 1096, 1012, 960, 814, 788, 700.

Example 2

Preparation of Polymer P1/3

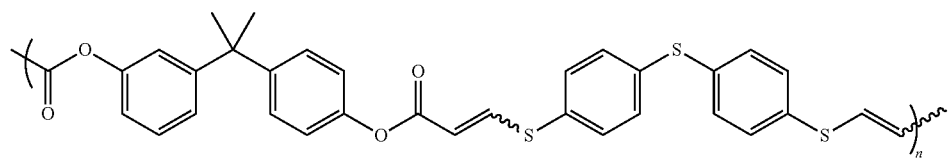

In a 15 mL Schlenk tube equipped with a three-way stopcock on the sidearm was placed 40 mg (0.15 mmol) of 4,4'-thiodibenzenethiol (1), 49 mg of 3 (0.15 mmol), and 0.5 g of diphenylamine (3 mmol) under nitrogen in a glovebox. Distilled DMF (2.5 mL) was injected into the tube using a hypodermic syringe. The mixture was stirred under room temperature for 24 hours. Afterwards, the polymerization mixture was added dropwise to ~300 mL diethyl ether through a cotton filter. The precipitate of the polymer was allowed to stand overnight and was then collected by filtration. The isolated polymer was washed with diethyl ether and dried under vacuum at room temperature to a constant weight.

Characterization data: White powder, yield: 97.2%. $M_w$: 29000, $M_w/M_n$: 1.7 (GPC, polystyrene calibration). $^1$H NMR (300 MHz): 1.783, 5.808, 5.829, 6.123, 6.156, 6.962, 6.989, 7.049, 7.075, 7.228, 7.258, 7.320, 7.404, 7.425, 7.452, 7.914, 7.964, 8.016. $^{13}$C NMR (75 MHz): 30.96, 42.51, 122.82, In a 15 mL Schlenk tube equipped with a three-way stopcock on the sidearm was placed 40 mg (0.15 mmol) of 4,4'-thiodibenzenethiol (1), 53 mg of 4 (0.15 mmol), and 0.5 g of diphenylamine (3 mmol) under nitrogen in a glovebox. Distilled DMF (2.5 mL) was injected into the tube using a hypodermic syringe. The mixture was stirred under room temperature for 24 hours. Afterwards, the polymerization mixture was added dropwise to ~300 mL diethyl ether through a cotton filter. The precipitate of the polymer was allowed to stand overnight and was then collected by filtration. The isolated polymer was washed with diethyl ether and dried under vacuum at room temperature to a constant weight.

Characterization data: White powder, yield: 87.2%. $M_w$: 7500, $M_w/M_n$: 2.1 (GPC, polystyrene calibration). $^1$H NMR (300 MHz): 5.765, 5.816, 6.112, 6.143, 6.874, 6.901, 7.051, 7.077, 7.226, 6.251, 7.263, 7.323, 7.347, 7.379, 7.408, 7.436, 7.485, 7.519, 7.744, 7.770, 7.953, 7.977, 8.001. $^{13}$C NMR (75 MHz): 111.79, 13.63, 116.16, 122.34, 122.53, 128.28, 128.86, 129.28, 129.94, 130.38, 131.27, 131.77, 132.55, 133.48, 133.75, 134.07, 134.55, 134.91, 135.10, 136.12, 138.39, 150.55, 153.45, 153.74, 154.24, 154.35, 161.16, 162.46, 163.08, 167.53. IR (thin film), v (cm$^{-1}$): 3062, 2092, 1724, 1568, 1474, 1388, 1356, 1324, 1296, 1210, 1134, 1102, 1012, 958, 818, 734.

Example 4

Preparation of Polymer P1/5

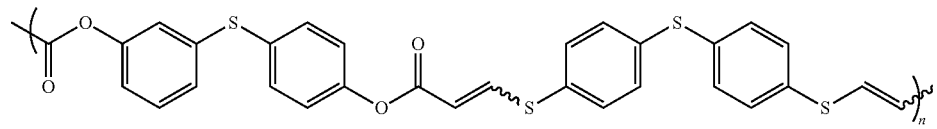

114.92, 120.88, 128.36, 131.26, 131.77, 131.83, 132.02, 132.09, 132.54, 133.74, 135.15, 135.93, 147.91, 148.37, 148.47, 151.64, 164.82. IR (thin film), v (cm$^{-1}$): 3061, 2965, 2926, 2866, 1714, 1574, 1505, 1475, 1392, 1359, 1205, 1169, 1144, 1100, 1080, 1012, 961, 818, 734.

Example 3

Preparation of Polymer P1/4

In a 15 mL Schlenk tube equipped with a three-way stopcock on the sidearm was placed 40 mg (0.15 mmol) of 4,4'-thiodibenzenethiol (1), 53 mg of 5 (0.15 mmol), and 0.5 g of diphenylamine (3 mmol) under nitrogen in a glovebox. Distilled DMF (2.5 mL) was injected into the tube using a hypodermic syringe. The mixture was stirred under room temperature for 24 h. Afterwards, the polymerization mixture was added dropwise to ~300 mL diethyl ether through a cotton filter. The precipitate of the polymer was allowed to stand

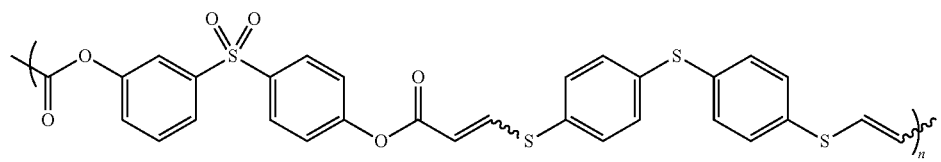

overnight and was then collected by filtration. The isolated polymer was washed with diethyl ether and dried under vacuum at room temperature to a constant weight.

Characterization data: White powder, yield: 98.2%. IR (thin film), ν (cm$^{-1}$): 3058, 2924, 2856, 1708, 1570, 1486, 1386, 1358, 1202, 1136, 1098, 1012, 960, 816, 788.

Example 5

Preparation of Polymer P(1-co-6a)

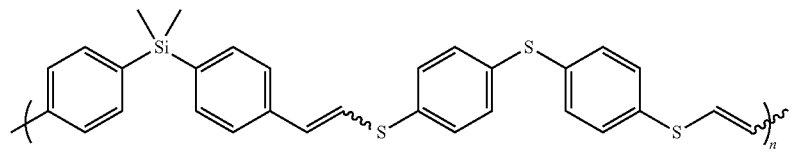

In a 15 mL Schlenk tube equipped with a three-way stopcock on the sidearm was placed 25 mg (0.1 mmol) of 4,4'-thiodibenzenethiol (1), 26 mg of 6a (0.1 mmol), and 0.9 mg (0.001 mmol) of Rh(PPh$_3$)$_3$Cl under nitrogen in a glovebox. 1,2-Dichloroethane (2 mL) was injected into the tube using a hypodermic syringe. The mixture was stirred at room temperature for 36 h. Afterwards, the polymerization mixture was added dropwise to ~300 mL methanol through a cotton filter. The precipitate of the polymer was allowed to stand overnight and was then collected by filtration. The isolated polymer was washed with methanol and dried under vacuum at room temperature to a constant weight.

Characterization data: Yellow powder, yield: 88.2%. M$_w$: 22500, M$_w$/M$_n$: 3.0 (GPC, polystyrene calibration).

Example 6

Preparation of Polymer P(1-co-6b)

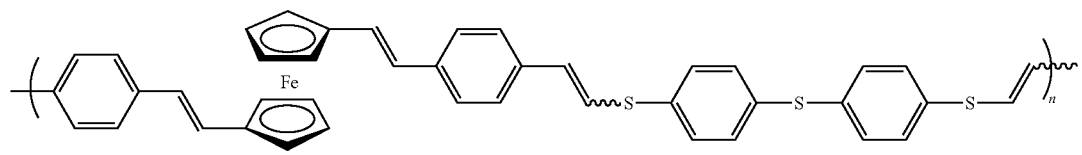

In a 15 mL Schlenk tube equipped with a three-way stopcock on the sidearm was placed 25 mg (0.1 mmol) of 4,4'-thiodibenzenethiol (1), 43.8 mg of 6b (0.1 mmol), and 0.9 mg (0.001 mmol) of Rh(PPh$_3$)$_3$Cl under nitrogen in a glovebox. 1,2-Dichloroethane (2 mL) was injected into the tube using a hypodermic syringe. The mixture was stirred at room temperature for 36 h. Afterwards, the polymerization mixture was added dropwise to ~300 mL methanol through a cotton filter. The precipitate of the polymer was allowed to stand overnight and was then collected by filtration. The isolated polymer was washed with methanol and dried under vacuum at room temperature to a constant weight.

Characterization data: Yellow powder, yield: 85.6%. M$_w$: 7000, M$_w$/M$_n$: 3.0 (GPC, polystyrene calibration).

Example 7

Preparation of Polymer P(1-co-6c)

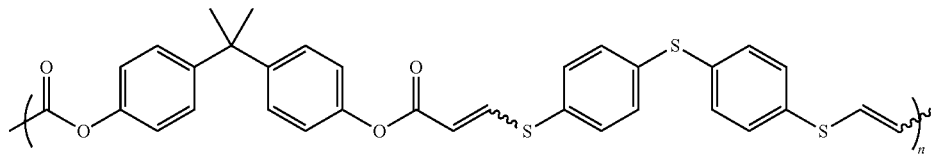

In a 15 mL Schlenk tube equipped with a three-way stopcock on the sidearm was placed 25 mg (0.1 mmol) of 4,4'-thiodibenzenethiol (1), 33.2 mg of 6c (0.1 mmol), and 0.9 mg (0.001 mmol) of Rh(PPh$_3$)$_3$Cl under nitrogen in a glovebox. 1,2-Dichloroethane (2 mL) was injected into the tube using a hypodermic syringe. The mixture was stirred at room temperature for 36 h. Afterwards, the polymerization mixture was added dropwise to ~300 mL methanol through a cotton filter. The precipitate of the polymer was allowed to stand overnight and was then collected by filtration. The isolated polymer was washed with methanol and dried under vacuum at room temperature to a constant weight.

Characterization data: Yellow powder, yield: 92.3%. M$_w$: 9500, M$_w$/M$_n$: 3.3 (GPC, polystyrene calibration).

Example 8

Preparation of Polymer P1/7

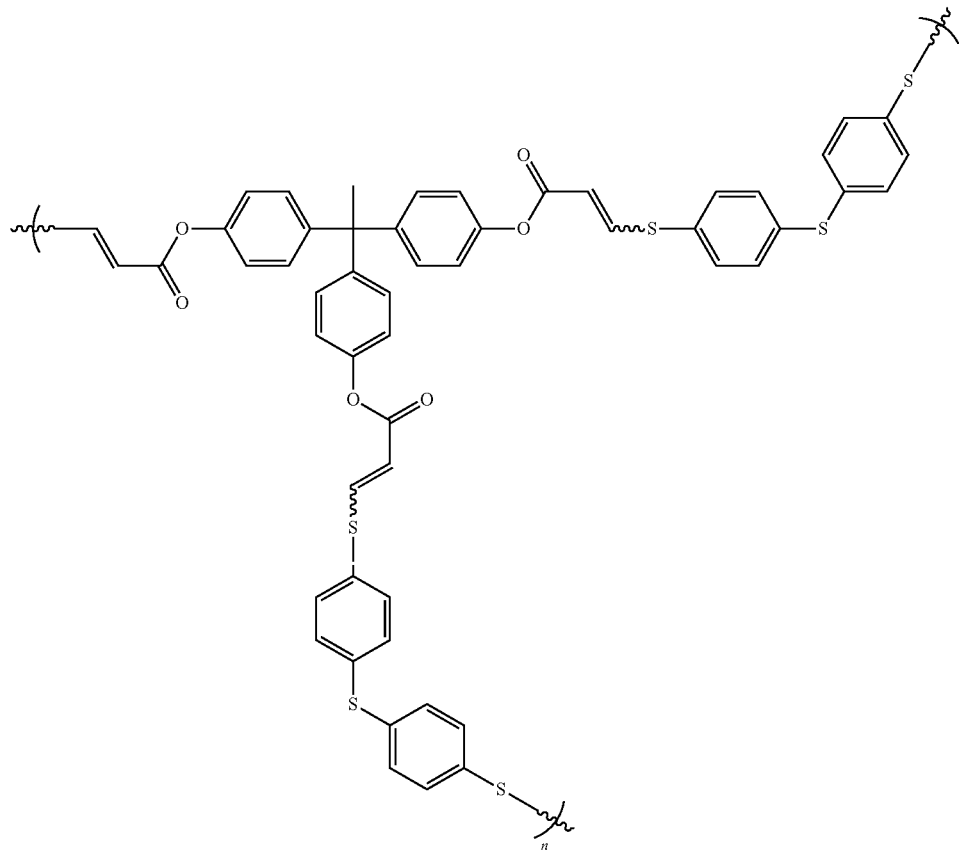

In a 15 mL Schlenk tube equipped with a three-way stopcock on the sidearm was placed 40 mg (0.15 mmol) of 4,4′-thiodibenzenethiol (1), 46.2 mg of 7 (0.1 mmol), and 0.5 g of diphenylamine (3 mmol) under nitrogen in a glovebox. Distilled DMF (2.5 mL) was injected into the tube using a hypodermic syringe. The mixture was stirred under room temperature for 24 h. Afterwards, the polymerization mixture was added drop wise to ~300 mL diethyl ether through a cotton filter. The precipitate of the polymer was allowed to stand overnight and was then collected by filtration. The isolated polymer was washed with diethyl ether and dried under vacuum at room temperature to a constant weight.

Characterization data: White powder, yield: 85.2%. $M_w$: 13000, $M_w/M_n$: 2.3 (GPC, polystyrene calibration).

Experimental Examples

Example 9

Solvent Effect on Polyhydrothiolation of 1 with 3[a]

Using various solvents including THF, 1,2-dichlorobenzene, toluene, dioxane and DMF, a polyhydrothiolation reaction was conducted at room temperature for 24 hours, using 0.6M of thiol compound 1 with alkyne compound 3 according to the present subject matter. As shown in Table 2, all the polymers were obtained in high yields, with molecular weights up to 5,200.

TABLE 2

| run | solvent | yield (%) | $M_w^b$ | $M_w/M_n^b$ |
|---|---|---|---|---|
| 1 | THF | 88.9 | 3,600 | 1.5 |
| 2 | 1,2-dichlorobenzene | 68.8 | 2,500 | 1.4 |
| 3 | toluene | 96.2 | 2,900 | 1.5 |
| 4 | dioxane | 85.9 | 5,000 | 1.8 |
| 5 | DMF | 91.8 | 5,200 | 1.7 |

[a]Carried out at room temperature for 24 hours under nitrogen. [1] = [3] = 0.06M.
[b]Determined by GPC in THF on the basis of a linear polystyrene calibration.

Example 10

Effect of Base on the Polyhydrothiolation of 1 with 3[a]

The effect of a base added into the reaction mixture was studied with various bases, and the results are shown in Table 3. With the addition of a base, the molecular weight of the resulting polymer increased significantly. While piperidine and methylpiperazine give insoluble gel products after reaction, all other polymers were soluble.

TABLE 3

| run | base | yield (%) | $M_w{}^b$ | $M_w/M_n{}^b$ |
|---|---|---|---|---|
| 1 | diethylamine | 37.0 | 17,100 | 3.2 |
| 2 | triethylamine | 71.7 | 6,300 | 1.7 |
| 3 | diphenylamine | 88.8 | 8,100 | 1.8 |
| 4 | triphenylamine | 97.1 | 6,800 | 1.7 |
| 5 | piperidine | | gel | |
| 6 | methylpiperazine | | gel | |
| 7 | morpholine | 81.8 | 3 900 | 1.7 |

[a]Carried out at room temperature for 24 hours under nitrogen. [1] = [3] = 0.6M; [base] = 0.6M.
[b]Determined by GPC in THF on the basis of a linear polystyrene calibration.

Example 11

Effect of Concentration of Base on the Polyhydrothiolation of 1 with 3[a]

Table 4 shows the effect of base concentration on the molecular weight and the yield of the resulting polymer. As the base concentration increases, the molecular weight of the polymer increased up to 30,100.

TABLE 4

| run | [base] (M) | yield (%) | $M_w{}^b$ | $M_w/M_n{}^b$ |
|---|---|---|---|---|
| 1 | 0.6 | 95.7 | 23,200 | 2.6 |
| 2 | 1.2 | 97.8 | 30,100 | 2.1 |

[a]Carried out at room temperature for 24 hours under nitrogen in the presence of diphenylamine. [1] = [3] = 0.06M.
[b]Determined by GPC in THF on the basis of a linear polystyrene calibration.

Example 12

Effect of Monomer Concentration on the Polyhydrothiolation of 1 with 3[a]

The monomer concentration of the polymerization was studied and the results are shown in Table 5. When the monomer concentration is at 0.06 M, the resulting polymer produces the highest yield and molecular weights.

TABLE 5

| run | [1] (M) | [3] (M) | yield (%) | $M_w{}^b$ | $M_w/M_n{}^b$ |
|---|---|---|---|---|---|
| 1 | 0.02 | 0.02 | 92.1 | 18,300 | 2.7 |
| 2 | 0.04 | 0.04 | 96.0 | 20,900 | 2.2 |
| 3 | 0.06 | 0.06 | 98.8 | 21,300 | 1.9 |
| 4 | 0.08 | 0.08 | 98.7 | 17,800 | 1.8 |
| 5 | 0.1 | 0.1 | 95.2 | 22,700 | 1.9 |

[a]Carried out at room temperature for 24 hours under nitrogen in the presence of diphenylamine. [base] = 1.2M.
[b]Determined by GPC in THF on the basis of a linear polystyrene calibration.

Example 13

Effect of Temperature and Reaction Time on the Polyhydrothiolation of 1 with 3[a]

Tables 6 and 7, respectively, show the effect of temperature and the effect of reaction time on the polymerization. The polymerization showed the best result under the reaction condition of room temperature and 24 hours.

TABLE 6

| run | temp (° C.) | yield (%) | $M_w{}^c$ | $M_w/M_n{}^c$ |
|---|---|---|---|---|
| 1 | rt | 97.8 | 29,100 | 2.0 |
| 2 | 70 | 96.8 | 27,000 | 2.1 |
| 3 | 153[b] | 69.2 | 6,200 | 2.3 |

[a]Carried out for 24 hours under nitrogen in the presence of diphenylamine. [1] = [3] = 0.06M; [base] = 1.2M.
[b]Determined by GPC in THF on the basis of a linear polystyrene calibration.

TABLE 7

| run | time (h) | yield (%) | $M_w{}^b$ | $M_w/M_n{}^b$ |
|---|---|---|---|---|
| 1 | 12 | 98.7 | 25,100 | 2.0 |
| 2 | 24 | 97.1 | 32,300 | 1.9 |
| 3 | 36 | 96.2 | 27,900 | 1.9 |

[a]Carried out at room temperature under nitrogen in the presence of diphenylamine. [1] = [3] = 0.06M; [base] = 1.2M.
[b]Determined by GPC in THF on the basis of a linear polystyrene calibration.

Example 14

Solubility of Polymers by Polyhydrothiolation of 1 with 2~5[a]

All the polymerization results with regard to the solubility of the resulting polymers are summarized in Table 8.

TABLE 8

| run | monomers | yield (%) | S[b] | $M_w{}^c$ | $M_w/M_n{}^c$ |
|---|---|---|---|---|---|
| 1 | 1, 2 | 73.5 | √ | 21,000 | 2.9 |
| 2[d] | 1, 3 | 97.2 | √ | 29,000 | 1.7 |
| 3[e] | 1, 3 | 97.8 | √ | 29,100 | 2.0 |
| 4 | 1, 4 | 87.2 | √ | 7,500 | 2.1 |
| 5 | 1, 5 | 98.2 | × | | |

[a]Carried out in room temperature for 24 hours in the presence of diphenylamin under nitrogen unless stated otherwise; [1] = [2~5] = 0.06M; [base] = 1.2M.
[b]Solubility (S) tested in common organic solvents such as toluene, DCM, chloroform and THF: √ = completely soluble, x = insoluble.
[c]Determined by GPC in THF on the basis of a linear polystyrene calibration.
[d]Conducted in air.
[e]Data taken from Table 6, no. 1.

Example 15

Thermal Properties of PVSs

Stability of the polymers has been evaluated by thermogravimetric analysis, as displayed in FIG. 4. All the polymers are very stable and start to degrade only at temperatures above 300° C. Table 9 summarizes the thermal properties of the polymers.

TABLE 9

| polymer | S (wt %)[b] | $T_d$ (° C.)[c] | $T_d$ (° C.)[d] | $W_r$ (%)[e] |
|---|---|---|---|---|
| P1/2 | 13.38 | 345 | 363 | 45.6 |
| P1/3 | 16.51 | 335 | 354 | 42.0 |
| P1/4 | 21.21 | 324 | 343 | 14.1 |
| P1/5 | 22.39 | 333 | 351 | 32.9 |

[a]Recorded under $N_2$ at a heating rate of 10° C./min.
[b]Sulfur content of the polymer.
[c]Temperature for 5% weight loss.
[d]Temperature for 10% weight loss.
[e]$W_r$ = Weight residue at 600° C.

Example 16

Refractive Indices and Chromatic Dispersions of Polymers[a]

Polymers P1/2 to P1/4 are complexed with $Co_2(CO)_8$. The UV spectra and the refractive indices of the polymer films are re-measured after complexation and displayed in FIGS. 7 and 8. Although the transparency of the polymer films slightly decreased, the refractive indices of the polymers greatly increased after complexation. The refractive indices of the polymer films after complexations can reach as high as 2.0. Table 10 shows the refractive indices and chromatic dispersions of the polymers.

TABLE 10

| film | n[b] | $n_{632.8}$ | $v_D$ | $v_D'$ | D | D[(′)] |
|---|---|---|---|---|---|---|
| P1/2 | 1.667 | 1.7004 | 18.4 | 70.4 | 0.054 | 0.014 |
| P1/3 | 1.675 | 1.6918 | 22.8 | 69.6 | 0.044 | 0.014 |
| P1/4 | 1.689 | 1.7317 | 26.3 | 539 | 0.038 | 0.002 |
| P1/2(Co) | 1.745 | 1.7728 | 13.6 | 50.7 | 0.074 | 0.020 |
| P1/3(Co) | 1.962 | 2.0593 | 18.6 | 80.0 | 0.054 | 0.014 |
| P1/4(Co) | 1.949 | 1.9166 | 156.5 | 643 | 0.006 | 0.002 |

[a]Abbreviations: n = refractive index (at 632.8 nm), $v_D$ = Abbé number, $v_D'$ = modified Abbé number, and D[(′)] = chromatic dispersion.
[b]Single data point measured at 632.8 nm using an ellipsometer.

The Abbé number ($v_D$) of a material is a measure of the variation or dispersion in its RI value with wavelength, which is defined as $$v_D = \frac{n_D - 1}{n_F - n_C} \quad (1)$$

where $n_D$, $n_F$, and $n_C$ are the RI values at wavelengths of Fraunhofer D, F, and C spectral lines of 589.2, 486.1, and 656.3 nm, respectively. A modified Abbé number ($v_D'$) has been proposed to evaluate the application potential of an optical material, using its RI values at the nonabsorbing wavelengths of 1064, 1319, and 1550 nm. The first two wavelengths are chosen in view of the practical interest of commercial laser wavelength (Nd:YAG), while the last one is the wavelength of telecommunication. The modified Abbé number is defined as $$v_D' = \frac{n_{1319} - 1}{n_{1064} - n_{1559}} \quad (2)$$

where $n_{1319}$, $n_{1064}$, and $n_{1550}$ are the RI values at 1319, 1064, and 1550 nm, respectively. The chromatic dispersion (D') is the constringence of the Abbé number ($v_D'$):

$$D^{(\prime)} = \frac{1}{v_D^{(\prime)}} \quad (3)$$

The optical dispersions of the polymers do not have much change after complexation. Table 11 shows the change in refractive indices of the polymer films at long wavelength side (1550 nm) before and after metal complexation. The refractive indices of the polymer films greatly increased after the complexation reaction.

TABLE 11

Comparison of Refractive Index at Long Wavelength Before and After Complexation[a]

| film | $n_{1550}$[b] | $n_{1550}$*[c] | $\Delta n_{1550}$ |
|---|---|---|---|
| P1/2 | 1.6583 | 1.7097 | 0.0514 |
| P1/3 | 1.6640 | 1.9962 | 0.3322 |
| P1/4 | 1.7004 | 1.9002 | 0.1998 |

[a]Complex with $Co_2(CO)_8$.
[b]Refractive index at 1550 nm.
[c]Refractive index at 1550 nm after complexation.

Example 17

Polymerization Data of 1 and 6[a]

Hydrothiolation reaction can also be catalyzed by a transition metal. The polymerization data between compounds 1 and 6, catalyzed by a transition metal catalyst, is shown in Table 12. The polymers are obtained in high yields and high molecular weights.

TABLE 12

| no. | polymer | [cat] | t (h) | yield (%) | Solubility[b] | $M_w$[c] | $M_w/M_n$[c] |
|---|---|---|---|---|---|---|---|
| 1 | P(1-co-6a) | 1% | 36 | 88.2 | √ | 22500 | 3.0 |
| 2 | P(1-co-6a)[d] | 1% | 36 | 94.6 | √ | 10500 | 2.8 |
| 3 | P(1-co-6a)[e] | 1% | 36 | 90.2 | √ | 13600 | 3.5 |
| 4 | P(1-co-6a) | 2% | 24 | 90.3 | √ | 19500 | 2.6 |
| 5 | P(1-co-6a) | 4% | 24 | 91.7 | Δ | 31500 | 3.3 |
| 6 | P(1-co-6b) | 1% | 36 | 85.6 | √ | 7000 | 3.2 |
| 7 | P(1-co-6c) | 1% | 36 | 92.3 | √ | 9500 | 3.3 |

[a]Polymerization reaction carried out in 1,2-dichloroethane at room temperature under nitrogen using $Rh(PPh_3)_3Cl$ as catalyst; [cat] = 0.5 mM, [M]$_o$ = 0.05M.
[b]Solubility (S) tested in common organic solvents such as THF, toluene, DCM, and chloroform; √ = completely soluble, Δ = partially soluble.
[c]Estimated by gel-permeation chromatography (GPC) in THF on the basis of a polystyrene calibration; $M_w$ = weight-average molecular weight; $M_w/M_n$ = polydispersity index (PDI); $M_n$ = number-average molecular weight.
[d]Monomer 1 and catalyst was first aged for 1 hours and then further reacted for another 35 h.
[e]Monomer 6a and catalyst was first aged for 1 hours and then further reacted for another 35 h.

The present subject matter being thus described, it will be apparent that the same may be modified or varied in many ways. Such modifications and variations are not to be regarded as a departure from the spirit and scope of the present subject matter, and all such modifications and variations are intended to be included within the scope of the following claims.

What is claimed is:

1. A method of preparing a sulfur-containing polymer comprising a plurality of internal units represented by the following formula (1a), (1a)

wherein n is greater than 1, comprising the following polymerization step:

Precursors $\xrightarrow{\text{base or catalyst}}$ wherein said precursor comprises alkyne having one or more acetylene groups and thiol having one or more thiol groups; R is remainder of said thiol excluding said thiol groups, R' is remainder of said alkyne excluding said acetylene groups, R and R' are independently selected from the group consisting of:

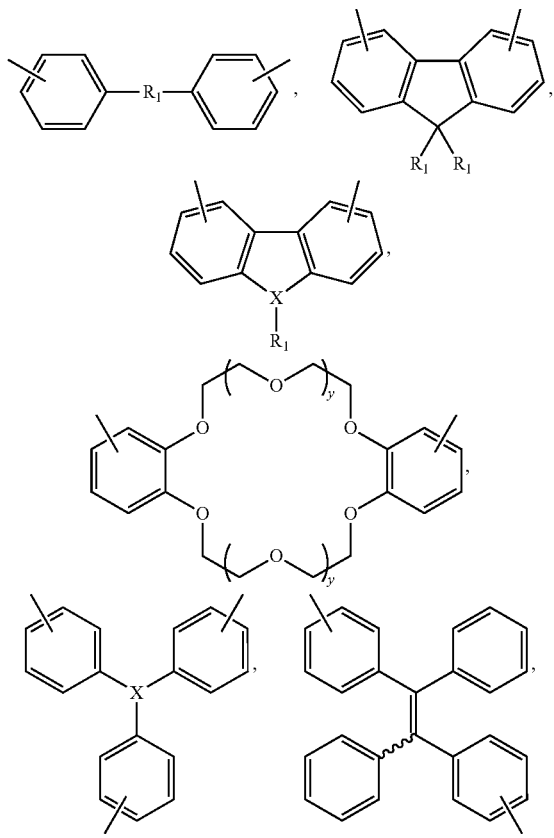

-continued

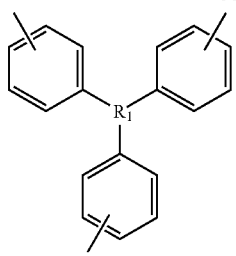

and —R$_1$—M—R$_1$—, wherein X is a heteroatom; y is ≥1; R$_1$ is selected from the group consisting of alkyl, alkenyl, acyl, aryl, heteroaryl, cycloalkyl, heterocycloalkyl, and heteroalkyl; M is a metal or an organometallic group; and each ⁓ represents a stereogenic cis or trans moiety.

2. The method of claim 1, wherein said polymerization is conducted under basic conditions, at room temperature and under nitrogen, or in air.

3. The method of claim 1, wherein said polymerization is conducted by catalyzation by a transition-metal catalyst at room temperature and under nitrogen.

4. The method of claim 1, wherein said polymerization is conducted for about 5-36 hours.

5. The method of claim 4, wherein said polymerization is conducted for about 20-24 hours.

6. The method of claim 1, wherein the polymers have refractive indices that are increased as sulfur content in said precursors is increased.

* * * * *